United States Patent
Nojima

[19]

[11] Patent Number: 6,163,750
[45] Date of Patent: Dec. 19, 2000

[54] ROUTE GUIDING DEVICE FOR VEHICLE

[75] Inventor: Akihiko Nojima, Toyota, Japan

[73] Assignee: Toyota Jidosha Kabushiki Kaisha, Toyota, Japan

[21] Appl. No.: 09/185,576

[22] Filed: Nov. 4, 1998

[30] Foreign Application Priority Data

May 14, 1996 [JP] Japan .................................. 8-119306

[51] Int. Cl.[7] .................................................. G06F 19/00
[52] U.S. Cl. ............................ 701/209; 701/96; 701/210; 701/211; 340/988; 340/990; 340/995
[58] Field of Search ............................. 701/96, 116, 209, 701/210, 211; 340/988, 990, 995

[56] References Cited

U.S. PATENT DOCUMENTS

| 5,026,153 | 6/1991 | Suzuki et al. ............................... 356/1 |
| 5,684,697 | 11/1997 | Mullen ...................................... 701/28 |

FOREIGN PATENT DOCUMENTS

| 2-67915 | 3/1990 | Japan . |
| 4-1520 | 1/1992 | Japan . |
| 7-63572 | 3/1995 | Japan . |
| 7-114690 | 5/1995 | Japan . |
| 7-209004 | 8/1995 | Japan . |
| 8-35847 | 2/1996 | Japan . |
| 8-86661 | 4/1996 | Japan . |
| 8-145709 | 6/1996 | Japan . |
| 8-159803 | 6/1996 | Japan . |
| 8-210867 | 8/1996 | Japan . |
| 9-113301 | 5/1997 | Japan . |
| 9-126790 | 5/1997 | Japan . |

*Primary Examiner*—William A. Cuchlinski, Jr.
*Assistant Examiner*—Arthur D. Donnelly
*Attorney, Agent, or Firm*—Burns, Doane, Swecker & Mathis, LLP

[57] ABSTRACT

When a car is traveling ahead of the car on which a route guidance device of this invention is carried, the route guidance device determines the distance D to the preceding vehicle and judges whether or not an intersection where the driver is to be guided is within the distance D from the preset location of the device-loaded vehicle. Namely, the device finds the timing at which the preceding vehicle enters the intersection. At that timing, the device gives a guidance based on the behavior of the preceding vehicle by announcing such a message that "Turn left at the intersection the preceding vehicle is now at", "Turn left at the intersection where the preceding vehicle is turning", "Turn left at the intersection the preceding vehicle is now passing straight through.", etc. Therefore, easily understandable guidance can be given at an intersection where the driver is to be guided.

7 Claims, 4 Drawing Sheets

ROUTE GUIDING DEVICE FOR VEHICLE

TECHNICAL FIELD

The present invention relates to a route guidance device for a vehicle for guiding the vehicle in an appropriate direction, and more particularly to a device providing easily understandable guidance to the driver of the vehicle reflecting to movement of a preceding vehicle.

BACKGROUND ART

Certain known vehicle navigation devices display a present position on a map and provide driving route guidance, and vehicles carrying such devices have become common. With these navigation devices, the setting of a destination results in the setting of a route to the destination, and route guidance based on the set route is performed during driving. In particular, since it is unsafe or impossible to view the display while driving, it is preferable that the guidance, such as for a left or right turn at the intersection, be given by voice. At intervals of 700 m, 300 m, and 100 m before an intersection, the driver is informed by voice to turn left or right at the approaching intersection. For example, the voice announces "turn left at XX intersection XX m ahead."

In this manner, preferred route guidance is performed in which the driver can be informed of left or right turns at an intersection without having to look at the display. An example of this type of voice-based route guidance is disclosed in Japanese Patent Laid-Open Publication No. Hei 7-209004.

However, there are also instances where voice guidance such as "XX m ahead" is unclear as to the intersection where a left or right turn is to be made, especially for an intersection having non-perpendicular roads (such as an intersection of five or six roads or an interchange) or for close intersections as are common in urban areas where, if a left turn is to be made at an intersection located 100 m ahead, there are instances in which it is unclear as to how a left turn is to be made at what intersection. Furthermore, although an expressions such as "diagonally to the right" can also be employed, there are instances in which it is not possible to make the voice guidance easily understandable.

DISCLOSURE OF INVENTION

It is therefore an object of the present invention to solve the aforementioned problem by providing a route guidance device for a vehicle so as to provide clearly understandable route guidance.

The present invention in a route guidance device for a vehicle for guiding a driver in the direction to be taken by the vehicle, comprises preceding vehicle direction detecting means for detecting the direction of travel of a preceding vehicle located ahead of the vehicle, and guiding means for guiding the direction of travel of the vehicle on the basis of the detected direction of travel of the preceding vehicle.

In this manner, since guidance is based on the direction of travel of the preceding vehicle, the guidance can be performed with reference to the direction of travel of the preceding vehicle, such as "turn left at the intersection where the vehicle in front made a left turn" or "turn left at the intersection the vehicle in front is now passing straight through". If there are a plurality of intersections in close proximity, or if there is a complex intersection, such as an intersection of five roads or an interchange, an easily understandable guidance can be provided.

Furthermore, according to this invention, the above-mentioned preceding vehicle direction detecting means captures images of an advance vehicle which is directly in front of the vehicle and detects the direction of travel of the preceding vehicle.

Processing the images of the preceding vehicle, such as those obtained from a CCD camera, enables all vehicles to be recognized, and following the movement of the preceding vehicle enables the direction of travel to be detected.

Furthermore, according to this invention, the above-mentioned preceding vehicle direction detecting means receives direction of travel information of the preceding vehicle and judges the direction of travel of the preceding vehicle.

Information on the direction of travel of the preceding vehicle may be obtained from a light beacon. If this information is used, the direction of travel of the preceding vehicle can be estimated before the preceding vehicle reaches an intersection for guidance. Therefore, a preferable guidance can be performed using this information.

Furthermore, the present invention in a route guidance device for a vehicle for guiding a driver in the direction to be taken by the vehicle, comprises preceding vehicle positioning means for detecting the position of a preceding vehicle located ahead of the vehicle, and guiding means for guiding the direction of travel of the vehicle on the basis of the detected position of the preceding vehicle.

Detecting the position of the preceding vehicle is relatively easy and enables the time at which the preceding vehicle enters an intersection for guidance to be known. At this time, the existence of the preceding vehicle can inform the driver as to the intersection for guidance. This clarifies the intersection for guidance, such as from other intersections in close proximity.

Furthermore, according to this invention, the above-mentioned preceding vehicle positioning means may include a vehicle-to-vehicle distance sensor for detecting the vehicle-to-vehicle distance to the vehicle and detects the position of a vehicle directly in front.

The vehicle-to-vehicle distance sensor can employ a laser radar so that a preferred detection of the vehicle-to-vehicle distance can be performed.

Performing guidance in this manner, with reference to the position or direction of travel of the preceding vehicle, enables an extremely understandable guidance to be performed at complex intersections. If guidance using the preceding vehicle cannot be performed, ordinary guidance can be performed without detracting from the usefulness of this invention.

BEST MODES FOR CARRYING OUT THE INVENTION

Preferred embodiments (referred to herein as "embodiments") of the present invention will be described hereinafter with reference to the drawings.

First Embodiment

Figure 1:
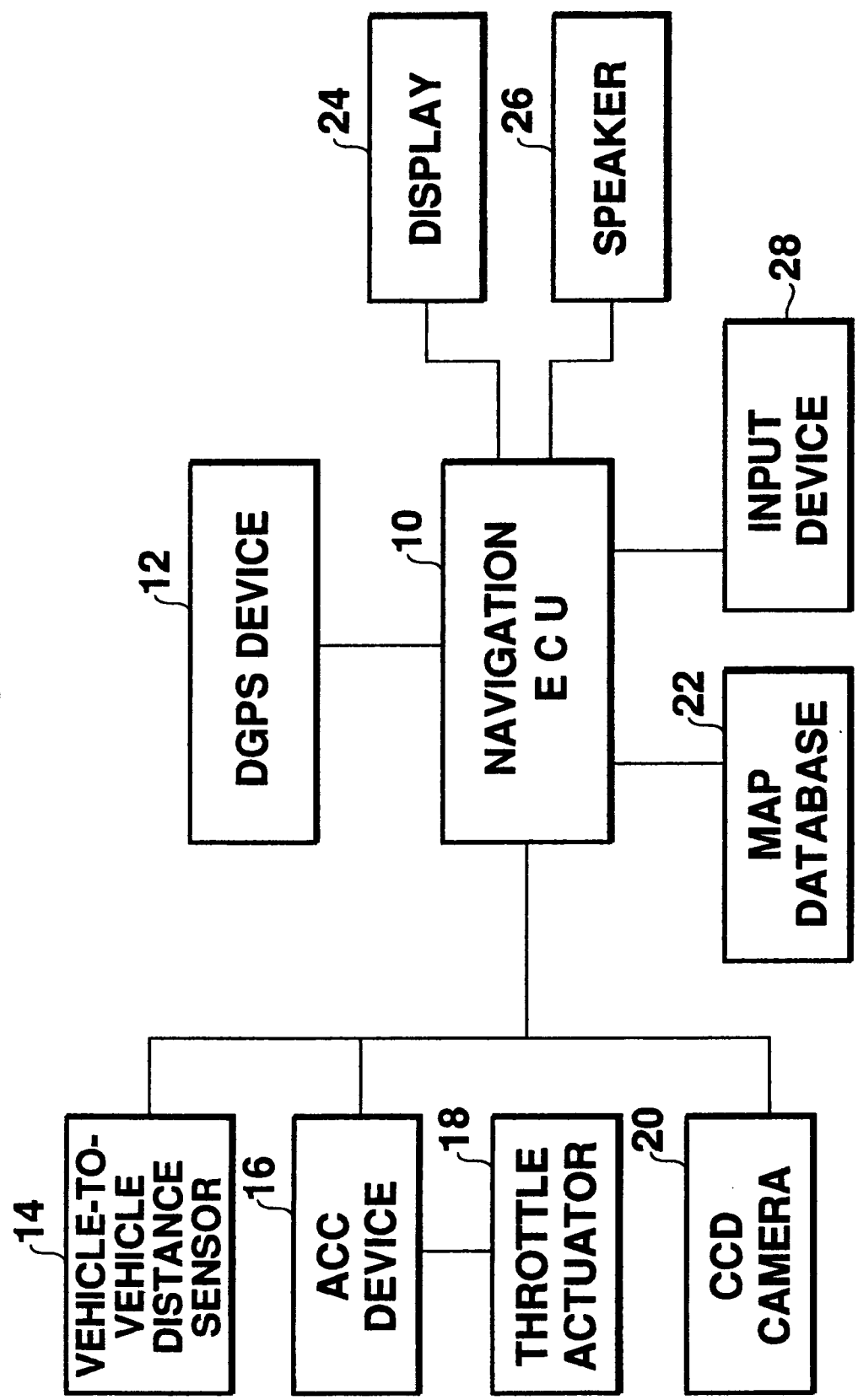
FIG. 1 is a block diagram showing a configuration of a device of a first embodiment.

FIG. 1 is a block diagram showing an overall configuration of the first embodiment. A navigation electric control unit (ECU) 10 performs various processing operations for route guidance. To the navigation ECU 10 is connected a differential global positioning system (DGPS) device 12 as a device for determining the vehicle position. The DGPS 12 receives radio signals from artificial satellites and improves the detected position by adjusting error information of the GPS, such as that obtained from FM multiplex broadcasts, with the GPS device that determines the vehicle position. Specifically, although the GPS-based positioning has an error of around 100 m, a predetermined fixed station detects and provides the extent of this error so that, after error correction, the detected position is improved to within about 1 m.

To the navigation ECU 10 is connected a vehicle-to-vehicle distance sensor 14. The vehicle-to-vehicle distance sensor 14 emits, for example, an infrared radar beam towards the front, and detects the vehicle-to-vehicle distance to the preceding vehicle after receiving the reflected waves.

To the navigation ECU 10 is connected an auto-cruise control (ACC) device 16. To the ACC device 16 is connected a throttle actuator 18, which automatically adjusts the throttle opening so that the vehicle speed attains a target vehicle speed. Namely, once the driver sets a target vehicle speed, the ACC device 16 controls the throttle opening via the throttle actuator 18 so as to adjust the vehicle speed to the target vehicle speed. If the vehicle-to-vehicle distance to the preceding vehicle as detected by the vehicle-to-vehicle distance sensor 14 decreases below a predetermined value, the ACC device 16 switches to vehicle-to-vehicle distance control so that the vehicle-to-vehicle distance is adjusted so as not to decrease below the predetermined value. The ACC device 16 is designed to also be controllable from the navigation ECU 10.

Furthermore, to the navigation ECU 10 is connected a CCD camera 20. The CCD camera 20 captures frontal images, and an image processor within the navigation ECU 10 performs image processing of the obtained images, recognizes the preceding vehicle, and detects its movements so as to detect the direction of travel. Specifically, at least information regarding whether the advance vehicle directly in front has traveled straight or turned at an intersection is obtained from image processing. The information regarding turns at intersections is judged with reference to road configurations obtained from map data.

To the navigation ECU 10 is connected a map database 22. The map database 22 stores road information of the entire country, and the navigation ECU 10 obtains map data from the map database 22 to be shown during route guidance and road dimensions to be used during route search.

To the navigation ECU 10 is connected a display device 24 and a speaker 26. The display device 24 displays a map showing the present position and displays a guidance map showing the direction to be traveled at an intersection for guidance, such as a left or right turn. The speaker 26 emits voice instructions for a left or right turn at the intersection for guidance. Processing operations for image display and voice output are performed by the navigation ECU 10. An input device 28 is for the input of various instructions, such as destination data when performing route setting.

Operation

When a destination is first set using the input device 28, the navigation ECU 10 sets the route using, for example, data of the map database 22. Regarding intersections for left or right turns, the display device 24 displays guidance screens and guidance is given through voice.

Figure 2:
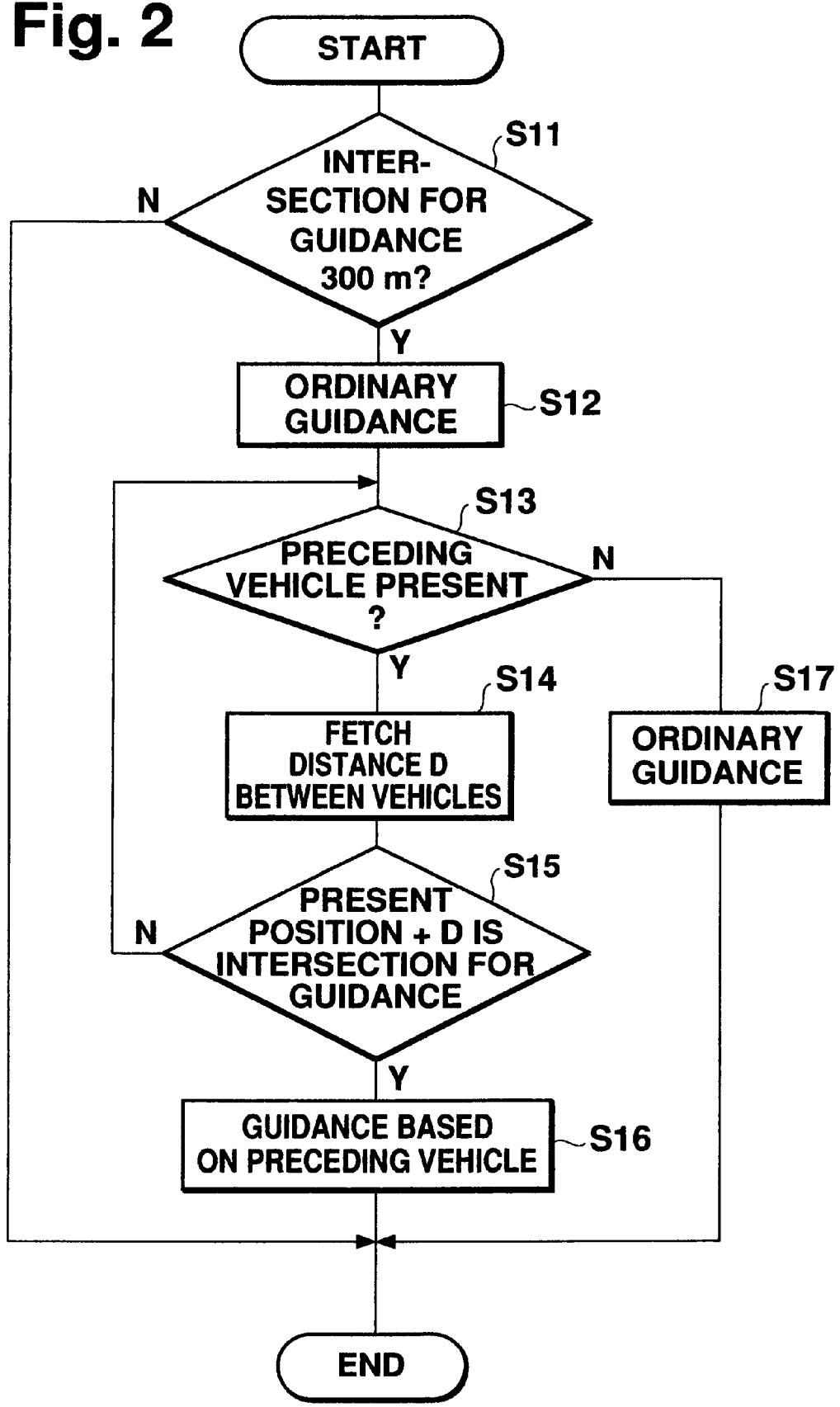
FIG. 2 is a flowchart showing a guidance operation.

At this time, as shown in FIG. 2, voice guidance in this embodiment is performed on the basis of the position of the advance vehicle. First, it is judged (S11) whether the intersection for guidance is 300 m ahead, and if it is 300 m ahead, an ordinary guidance (S12) is performed indicating a left or right turn is to be made at XX intersection 300 m ahead. Next, from the output of the vehicle-to-vehicle distance sensor 14 it is judged (S13) whether or not there is a preceding vehicle, and if there is a preceding vehicle, the vehicle-to-vehicle distance D at the time is fetched (S14). Then it is judged (S15) whether the present position+D is the intersection for guidance. Namely, it is judged whether the preceding vehicle has reached the intersection for guidance. If not, the execution returns to S13 and the procedure is repeated.

When the preceding vehicle reaches the intersection for guidance, a guidance voice, such as "turn left at the intersection the preceding vehicle is now passing through", is issued from the speaker 26.

On the other hand, if a preceding vehicle could not be detected at S13, guidance based on a preceding vehicle is not possible so instructions for a left or right turn is performed (S17) as usual around 100 m beforehand.

Figure 3:
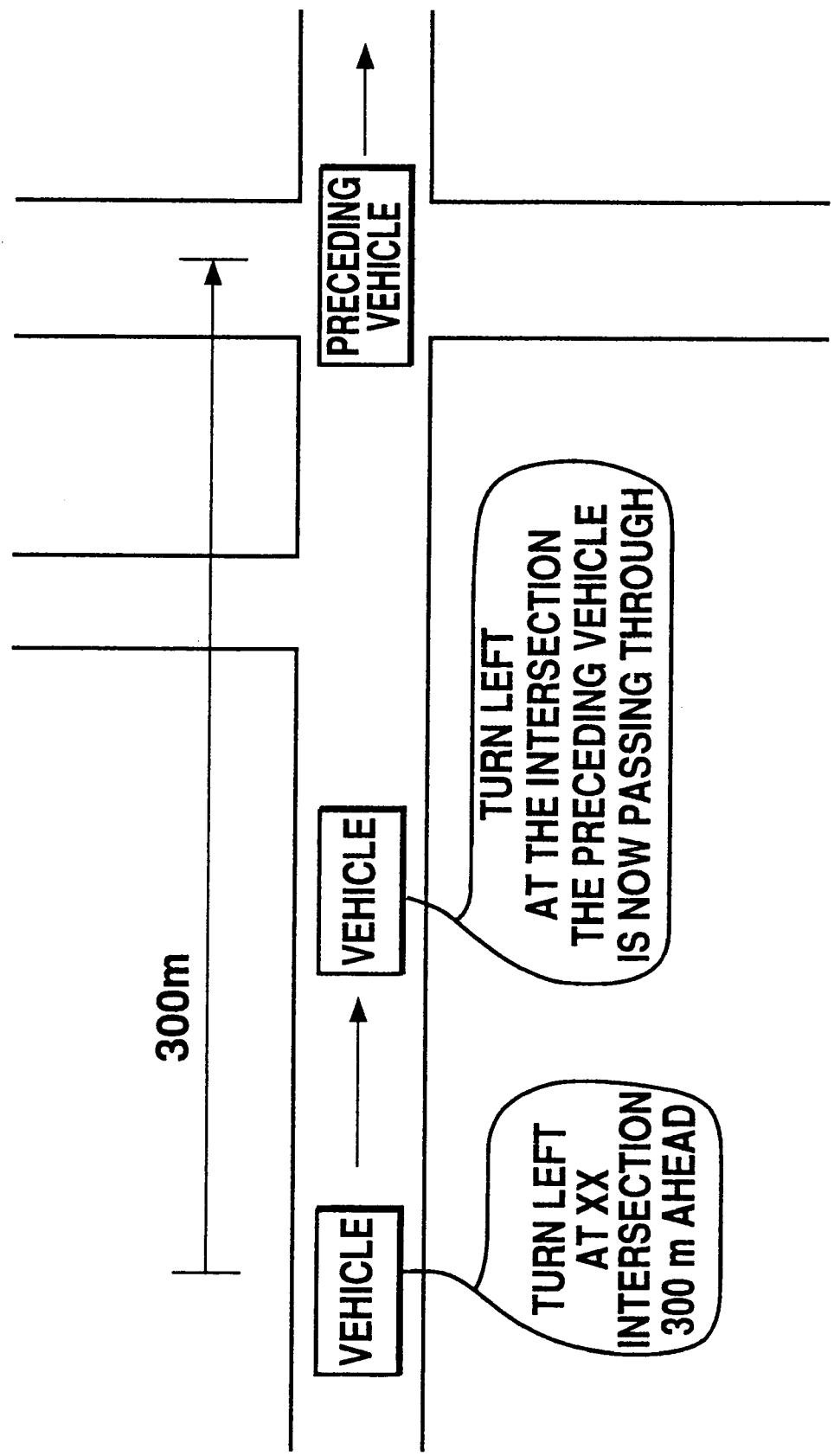
FIG. 3 illustrates the guidance operation.

Thus, if there is a preceding vehicle as shown in FIG. 3, a guidance of "turn left at XX intersection 300 m ahead" is performed 300 m before the intersection for guidance. Thereafter, when the preceding vehicle has reached the intersection for guidance, a guidance of "turn left at the intersection of the preceding vehicle" is given. In this manner, it is clearly understood which intersection is the intersection for guidance at interchanges or intersections in close proximity.

Guidance Expression

As described above, the guidance based on the preceding vehicle in S16 incorporates not only the position of the preceding vehicle, but also the movement of the preceding vehicle. When it was possible to detect a left or right turn or a straight movement of the preceding vehicle from the images of the CCD camera 20, guidance such as "turn left at the intersection the preceding vehicle is now passing straight through", "follow the preceding vehicle and turn left", or "turn left at the intersection where the preceding vehicle is turning to the right" is provided.

Furthermore, at a complex intersection, such as an intersection of five roads, an easily understandable guidance for the driver can be expressed using a relative expression, such as "proceed in a direction one street to the left of the direction traveled by the preceding vehicle".

If the preceding vehicle turned at an intersection before the intersection for guidance, it is preferable to use such an expression as "turn left at the next intersection after where the preceding vehicle has just turned".

Second Embodiment

Figure 4:
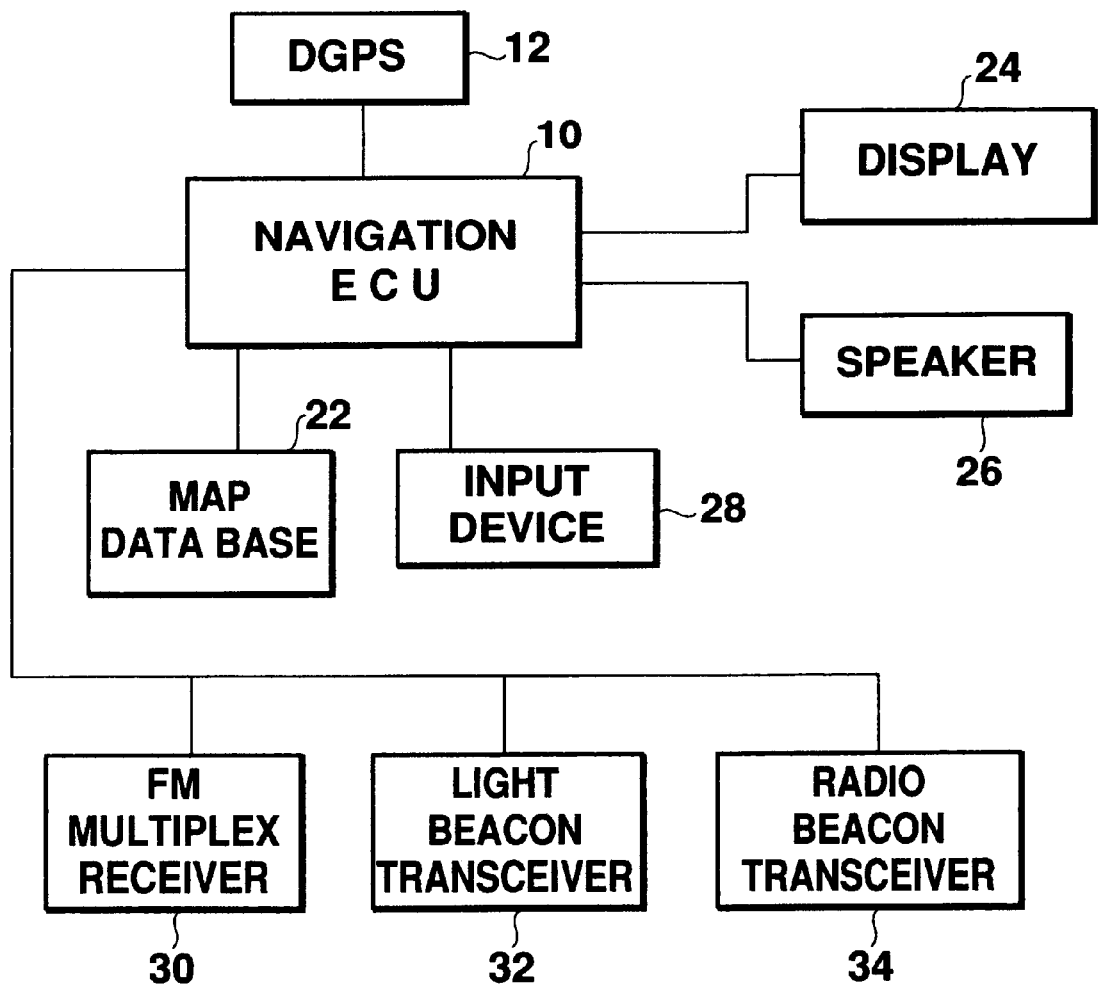
FIG. 4 is a block diagram showing a configuration of a device of a second embodiment.

FIG. 4 is a block diagram of the second embodiment. In this example, to the navigation ECU 10 is connected an FM multiplex receiver 30, a light beacon transceiver 32, and a radio beacon transceiver 34.

The FM multiplex receiver 30 receives traffic information, such as traffic jam information, which is multiplexed into an ordinary FM broadcast wave, and the received data is furnished to the navigation ECU 10. The above-mentioned DGPS error information can also be received with the FM multiplex receiver 30.

The light beacon transceiver 32 communicates with light beacons installed roadside on ordinary roads and receives services for absolute position information and traffic jam information. The radio beacon transceiver 34 communicates with radio beacons installed roadside on expressways and receives the same services as the light beacon transceiver 32.

When a travel destination is provided to the light beacon transceiver 32, route guidance information can be received at the light beacon transceiver 32. Therefore, a service provider using the light beacons has a general idea of the route of the vehicle that provided the destination. As a result, information on the travel route of a given vehicle can be furnished to other vehicles.

When a vehicle that provided information on route guidance approaches the intersection for guidance, information can be furnished indicating how the preceding vehicle passes the intersection for guidance.

Based on information from the light beacon, the movement at the intersection for guidance of the preceding vehicle is estimated and used in guidance for a left or right turn at the intersection. According to this method, guidance of "turn left at the intersection where the preceding vehicle is turning to the right" is performed.

Furthermore, vehicle-to-vehicle communications can be performed using the light beacons. In this case, a request can be made to the preceding vehicle for information on the movement at the intersection, and this information can be obtained. If direct vehicle-to-vehicle communications are possible, information may also be obtained in this manner.

Other Configurations

If vehicle-to-vehicle distance control is performed using the ACC device 16 during route guidance, the distance between vehicles may be adjusted to a slightly longer distance before the intersection for guidance. This allows the guidance based on the movement of the preceding vehicle at the intersection to be performed with an added margin.

Furthermore, if the route is the same with the preceding vehicle, a sound, such as a beep, can be used to inform the driver to follow the preceding vehicle without using word instructions.

Although position-based control (first embodiment) and communication-based control (second embodiment) were described separately in the above examples, both may be included and both types of information may be used. In this case, the communication-based guidance can be used before the preceding vehicle reaches the intersection for guidance, and this is provided as estimated information so that when the present preceding vehicle actually reaches the intersection for guidance, the guidance can be complemented.

Furthermore, with the vehicle stopped in a traffic jam and when the preceding vehicle begins to move, it is preferable to output a guidance voice of "preceding vehicle has started to move" according to the detected result of the vehicle-to-vehicle distance sensor 14.

Where there are a plurality of lanes, or if not only the vehicle directly in front but also the vehicle in front of it can be recognized, it is preferable to recognize the preceding vehicles through image processing and communications and indicate specific vehicles with expressions such as "red car" or "truck".

What is claimed is:

1. A route guidance device for a vehicle for guiding a driver in an appropriate direction to be taken by the vehicle, the route guidance device comprising:

preceding vehicle direction detecting means for detecting the direction of travel of a preceding vehicle located ahead of the vehicle; and guiding means for guiding the direction of travel of the vehicle on the basis of the detected direction of travel of the preceding vehicle.

2. A device according to claim 1 wherein said preceding vehicle direction detecting means captures images of an advance vehicle, which is directly in front of the vehicle, and detects the direction of travel of the preceding vehicle.

3. A device according to claim 1 wherein said preceding vehicle direction detecting means receives direction of travel information of the preceding vehicle and determines the direction of travel of the preceding vehicle.

4. A route guidance device for vehicle for guiding the driver in an appropriate direction to be taken by the vehicle, the route guidance device comprising:

preceding vehicle positioning means for detecting a position of the preceding vehicle located in front of the vehicle; and guidance means for guiding the direction of travel of the vehicle on the basis of the position of said preceding vehicle.

5. A device according to claim 4 wherein said preceding vehicle positioning means includes a vehicle-to-vehicle sensor for detecting a vehicle-to-vehicle distance to the vehicle and detects the position of a vehicle directly in front.

6. A device according to claim 1, wherein said guiding means outputs a guide voice which includes an expression about the detected direction of travel of the preceding vehicle.

7. A device according to claim 4, wherein the guiding means outputs a guide voice which includes an expression about the detected position of the preceding vehicle.

* * * * *